3,408,376
NOVEL PROCESSES FOR PREPARING
FERROCENE-CYCLIC ETHERS
John T. Suh, Mequon, Wis., assignor to Colgate-Palmolive Company, New York, N.Y., a corporation of Delaware
No Drawing. Filed Oct. 7, 1965, Ser. No. 493,872
9 Claims. (Cl. 260—439)

ABSTRACT OF THE DISCLOSURE

The process comprises dissolving a ferrocene diol in an acidic media containing at least about 70% of a lower aliphatic acid, then adding water in increments to the resulting solution to selectively precipitate the corresponding ferrocene cyclic ether in a highly purified form in yields higher than those previously obtainable. The cyclic ethers thus obtained are useful as hematinic agents.

---

This application relates to ferrocene derivatives. More particularly, it relates to a novel process of preparing ferrocene cyclic ethers. Ferrocene is the commonly accepted name for dicyclopentadienyliron or biscyclopentadienyliron.

The ferrocene cyclic ethers may be represented by the following formula:

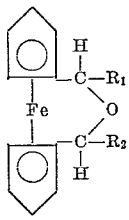

in which $R_1$ and $R_2$ are selected from hydrogen, a lower alkyl such as methyl, ethyl, isopropyl, butyl, pentyl and hexyl, an aryl such as phenyl, or a nuclear-substituted phenyl such as a holgen-substituted phenyl, an aralkyl such as benzyl, phenethyl, phenylisopropyl and diphenylmethyl, a cycloalkyl, particularly a cycloalkyl having from 3 to 7 carbon atoms such as cyclopropyl, cyclopentyl and cyclohexyl, and a cycloalkyl-lower alkyl such as cyclohexylmethyl or cyclopentylethyl.

The novel process of the present invention comprises treating a ferrocene diol with a liquid lower aliphatic acid and water. The process proceeds quickly even at room temperature and the ethers obtained are of high purity and usually do not require additional purification. In addition, the ethers are produced in higher yields than was previously possible.

The process of the present invention may be represented as follows:

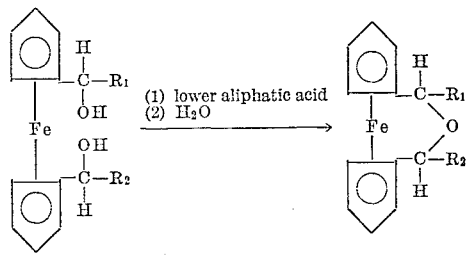

in which $R_1$ and $R_2$ have their previously assigned values.

In the preferred practice of the invention, an excess of glacial acetic acid is added portionwise to dissolve the diol employed as a starting material. The resulting solution is then stirred at room temperature and the water added in small portions. The mixture is then cooled and the cyclic ether recovered by filtration or other conventional means.

In addition to acetic acid, other liquid lower aliphatic acids such as formic and propionic acids can be used. Aqueous solutions of the acids may be employed, but the concentration of the acid should be about 70% to 100% by volume. The amount of acid required is an amount that will completely dissolve the diol employed as a starting material. However, a slight excess of acid is generally preferred to insure complete solution of the diol.

The amount of water to be employed for cyclization preferably ranges from about 2% by volume as based on the acid to an amount which will precipitate the cyclic ether which forms. The water may be present in the acid before the diol is dissolved therein, as for example when 70% acetic acid is used, or it may be added to the acid in which the diol has been already dissolved, as for example, where glacial acetic acid is employed to dissolve the diol.

If it is preferred to have the water present in the acid prior to adding the ferrocene diol, care must be taken not to have too much water present or the diol will not completely dissolve. Similarly, it is preferred to add the water in small portions to the undiluted acid in which the diol has been dissolved to prevent the acid from being diluted too quickly and the unreacted diol from precipitating prematurely.

Since the cyclic ethers are not soluble in a dilute acid mixture the addition of excess water precipitates the ether and facilitates its isolation.

The preferred method, which comprises dissolving the diol in acid and then adding water in small portions until the cyclic ether precipitates, minimizes the risk of precipitating the unreacted diol and, in addition, facilitates the separation of the ether from the reaction mixture.

The reaction proceeds rather quickly even at room temperature and some of the reactions are substantially complete in as little as 5 to 15 minutes. However, others may take much longer. The reactions may be conducted at elevated temperatures ranging from about 0° C. to 90° C. and, if desired, under a nitrogen atmosphere.

Representative of the cyclic ethers which may be prepared by the process of the present invention are the following:

1,1'-dimethyl-α,α'-epoxyferrocene,
1,1'-diethyl-α,α'-epoxyferrocene,
1,1'-dibenzyl-α,α'-epoxyferrocene,
1,1'-dihexyl-α,α'-epoxyferrocene,
1-ethyl-1'-propyl-α,α'-epoxyferrocene, and
1-benzyl-1'-ethyl-α,α'-epoxyferrocene.

The diols intended for use as starting materials in the preparation of the cyclic ethers may be prepared by treating the corresponding diacyl compounds with a chemical reducing agent such as lithium aluminum hydride or sodium borohydride, or with hydrogen under superatmospheric pressure at temperatures below 75° C. in the presence of a hydrogenation catalyst such as a platinum or palladium catalyst (U.S. Patent No. 2,810,737).

The diols also may be prepared by treating the diacetyl derivative with sodium hydroxide in the presence of chlorine to form the dicarboxylic acid, and then reducing the dicarboxylic acid in the free acid form or in the form of a lower alkyl ester with a chemical reducing agent such as lithium aluminum hydride.

Illustrative of the diols which may be prepared by the above processes are the following:

1,1'-dihydroxymethylferrocene,
1,1'-di-$\alpha$-hydroxyethylferrocene,
1,1'-di-$\alpha$-hydroxybutylferrocene,
1,1'-di-$\alpha$-hydroxypentylferrocene,
1,1'-di-$\alpha$-hydroxybenzylferrocene,
1,1'-di-$\alpha$-hydroxyhexylferrocene,
1-($\alpha$-hydroxyethyl)-1'-($\alpha$'-hydroxypropyl)ferrocene, and
1-($\alpha$-hydroxyethyl)-1'-($\alpha$'-hydroxybenzyl)ferrocene.

The following is a brief description of the preparation of the diacyl derivatives which are used to prepare the above described diols.

The symmetrical diacyl derivatives, those in which $R_1$ and $R_2$ are the same and which are used to prepare the symmetrical diols, may be prepared by treating ferrocene with an acid chloride, or an acid anhydride and aluminum chloride in the manner described by Woodward, Rosenblum and Whiting in J. Am. Chem. Soc. 74, 3458 (1952).

The unsymmetrical diacyl derivatives in which $R_1$ and $R_2$ are different may be prepared by first producing the monoacyl derivatives by treating ferrocene with an aliphatic acylating agent, such as a carboxylic acid anhydride, at a temperature between 20° and 120° C., in the presence of a suitable Friedel Crafts catalyst such as $BF_3$-etherate, hydrogen fluoride, a metal chloride such as aluminum chloride, or a polyphosphoric acid (U.S. Patent No. 2,988,562).

The monoacyl derivative thus obtained, is then treated with an acylating agent, such as an acid chloride which contains a different acyl group, in the presence of a Friedel Crafts condensing agent, such as described above. The resulting diacyl compound may be converted to the corresponding unsymmetrical diol in the manner described for the symmetrical diols.

The unsymmetrical diol may then be treated with an alkyl carboxylic acid and water, as was previously described, to form the cyclic ether.

Ferrocene, which is used to prepare the acyl derivatives, is commercially available from several sources. However, if desired, it may be prepared in the laboratory by a variety of methods. One such method involves the reaction between cyclopentadiene and iron pentacarbonyl in the manner described in U.S. Patent No. 2,791,597. Another such method involves the Grignard reaction between a cyclopentadienyl magnesium halide and an anhydrous halide of iron dissolved in ether, as described in U.S. Patent No. 2,680,756. Still another method comprises treating an anhydrous halide of iron with cyclopentadienyl sodium in the manner described in U.S. Patent No. 3,092,647.

The ferrocene cyclic ethers are promising hematinic agents useful in the treatment of iron deficiency anemia in animals, such as piglets and humans.

When used as hematinic agents, the ferrocene-cyclic ethers may be combined with pharmaceutical diluents and formed into dosage forms suitable for oral or parenteral administration such as tablets, capsules, syrups, elixirs, solutions or the like.

Pharmaceutical carriers which are either liquid or solid may be employed. The preferred liquid carrier is water. However, suitable organic solvents such as propylene glycol may also be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined amount of one or more of the active ingredients as a non-toxic acid addition salt and may be administered one or more at a time at regular intervals. Such unit dosage forms, however, should advisably contain about 5 to 500 mg. of the active ingredients.

A typical tablet may have the following composition:

|  | Mg. |
|---|---|
| Ferrocene cyclic ether | 250 |
| Polyvinylpyrrolidone (pharmaceutical grade) | 15 |
| Corn starch | 50 |
| Magnesium stearate | 3 |

The tablets are formed on a ⅜ inch deep cup punch and the tablets may be coated, if desired.

A typical soft gelatin capsule, size 0, may have the following composition:

| | | |
|---|---|---|
| Ferrocene cyclic ether | mg | 250 |
| Polyethylene glycol 400 (q.s.ad.) | cc | 0.5 |

A typical oil solution may contain the following ingredients in each teaspoonful:

| | | |
|---|---|---|
| Ferrocene cyclic ether | mg | 250 |
| Preservatives and flavor | | q.s. |
| Peanut oil (q.s.ad.) | ml | 5 |

A typical aqueous suspension intended for oral administration may contain the following ingredients in each teaspoonful:

| | | |
|---|---|---|
| Ferrocene cyclic ether | mg | 250 |
| Sorbitol | cc | 1.250 |
| Sodium carboxymethyl cellulose | mg | 50 |
| Cellulose (microcrystalline) | mg | 500 |
| Preservatives and flavor | | q.s. |
| Water (q.s.ad.) | cc | 5 |

The exact quantity of the composition to be administered, of course, will depend upon many factors including the elemental iron content of the compound and the nature and extent of the iron deficiency of the patient. However, generally speaking, the amount administered in a single day will be equivalent to about 5 mg. to about 500 mg. of elemental iron.

The following examples illustrate the preparation of the intermediates and the cyclic ethers:

Example 1.—1,1'-diacetylferrocene

To a mixture of 159 g. (1.2 moles) of aluminum chloride in 600 ml. of methylene chloride is added in portions 96 ml. (1.35 moles) of acetyl chloride over at 15 minute period. To the resulting mixture is added in portions with stirring a solution of 90 g. (0.486 mole) of ferrocene in 500 ml. of methylene chloride over a 25 minute period. The mixture is stirred at room temperature for two hours and poured over 3 liters of crushed ice.

The reaction mixture is filtered and the aqueous layer is extracted with three 500 ml. portions of chloroform. The combined organic layer is washed three times with water (800 ml.), dried over anhydrous sodium sulfate, filtered, and distilled under reduced pressure to yield a dark red residue. After one recrystallization from isopropyl alcohol 87.9 g. (67%) of 1,1'-diacetylferrocene, M.P. 126–127°, is obtained.

Analysis.—Calcd. for $C_{14}H_{14}FeO_2$:Fe, 20.67. Found: Fe, 20.35.

Example 2.—1,1'-di-$\alpha$-hydroxyethylferrocene

A mixture of diacetylferrocene (27.0 g., 0.1 mole) and sodium borohydride (7.6 g., 0.2 mole) in 200 ml. of 2-propanol is refluxed under nitrogen for 5 hours. The solvent is removed under vacuum, and the residue is treated with 400 ml. of water. The crude product is taken up in ether, dried over anhydrous sodium sulfate and evaporated. The remaining amber oil is dissolved in hot n-hexane, the solution is filtered and cooled with scratching. The diol precipitates as yellow-orange needles, 23.6 g. (86.1%), M.P. 68–70°.

*Analysis.*—Calcd. for $C_{14}H_{18}O_2Fe$: 20.37. Found: Fe, 20.09.

Example 3.—1,1'-diethyl-α,α'-epoxyferrocene

To fifteen grams (0.55 mole) of 1,1'-di-α-hydroxyethyl ferrocene is added in portions 100 ml. of glacial acetic acid and the solution is stirred at room temperature under nitrogen atmosphere for 15 minutes.

To the solution is added dropwise under nitrogen atmosphere 200 ml. of water during a 25 minute period and the mixture is cooled. The bright yellow solid product is filtered, washed with water, and dried to give 13.1 g. (93.5%) of 1,1'-diethyl-α,α'-epoxyferrocene, M.P. 101–102°.

*Analysis.*—Calcd. for $C_{14}H_{16}FeO$: C, 65.52; H, 6.25; Fe, 21.81. Found: C, 65.19; H, 6.26; Fe, 21.54.

Example 4.—1,1'-dibenzoylferrocene

To a mixture of 361 g. (2.7 mole) of aluminum chloride in 1200 ml. of dichloromethane is added 432 g. (3.1 mole) of benzoyl chloride over a period of 40 minutes after which a solution containing 205 g. (1.1 mole) of ferrocene dissolved in 1200 ml. of dichloromethane is added over a period of 80 minutes. The mixture is stirred at room temperature for 2 hours and poured onto 8 liters of crushed ice. The aqueous layer is separated and washed twice with 300 ml. portion of dichloromethane. The combined organic solution is washed twice with 1 liter portions of 10% sodium hydroxide solution, once with 1 liter of water, dried over sodium sulfate, and concentrated in vacuo to yield a red syrup which is crystallized from ethanol to yield 1,1'-dibenzoylferrocene in the form of a dark red crystalline solid, M.P. 100–103°.

*Analysis.*—Calcd. for $C_{24}H_{18}FeO_2$: Fe, 14.17. Found: Fe, 13.97.

Example 5.—1,1'-di-α-hydroxybenzylferrocene

To a mixture of 7.6 g. (0.2 mole) of sodium borohydride in 500 ml. of isopropanol there is added in portions 30 g. (0.077 mole) of 1,1'-dibenzoylferrocene with cooling and stirring. The reaction mixture is stirred at room temperature for two hours and then allowed to reflux for five hours.

The reaction mixture is cooled and distilled under diminished pressure to remove the solvent and the residue is dissolved in 750 ml. of water. The solid product is filtered and recrystallized from dilute isopropanol to give 1,1'-di-α-hydroxybenzylferrocene, M.P. 132°, light brown plates.

*Analysis.*—Calcd. for $C_{24}H_{22}FeO_2$: Fe, 14.02. Found: Fe, 13.95.

Example 6.—1,1'-dibenzyl-α,α'-epoxyferrocene

Three grams (0.00755 mole) of 1,1'-di-α-hydroxybenzylferrocene is dissolved in 175 ml. of glacial acetic acid and the solution is stirred at room temperature for 24 hours under nitrogen atmosphere.

To the reaction mixture is added in portions 150 ml. of water while stirring and the resulting yellow solid product is filtered and dried to give 2.65 g. (92.5%) of 1,1'-dibenzyl-α,α'-epoxyferrocene, M.P. 172–185°.

*Analysis.*—Calcd. for $C_{24}H_{20}FeO$: Fe, 14.69. Found: Fe, 14.82.

Example 7.—1,1'-dihexanoylferrocene

To a mixture of 164 g. (1.24 mole) of aluminum chloride in 550 ml. of dichloromethane is added 187 g. (1.39 mole) of hexanoyl chloride in 15 minutes, then a filtered solution of 93 g. (0.5 mole) of ferrocene in 600 ml. of dichloromethane is added in 40 minutes. The mixture is stirred at room temperature for 2 hours and poured onto 3 liters of crushed ice. The aqueous layer is separated and extracted once with 300 ml. of dichloromethane. The combined organic solution is washed once with 1 liter of water, once with 1 liter of 10% sodium hydroxide, and once with 500 ml. of brine after which it is dried and concentrated. The dark red oily residue is crystallized from n-hexane to yield 1,1'-dihexanoylferrocene in the form of rust red needles, M.P. 43–45°.

*Analysis.*—Calcd. for $C_{22}H_{30}FeO_2$: C, 69.13; H, 7.90; Fe, 14.61. Found: C, 69.16; H, 7.95; Fe, 14.57.

Example 8.—1.1'-di-α-hydroxyhexylferrocene

To a mixture of 8 g. (0.21 mole) of sodium borohydride in 500 ml. of isopropanol is added 38.2 g. (0.1 mole) of 1,1'-dihexanoylferrocene in one portion after which the mixture is gently refluxed for 6 hours. It is then cooled and dissolved in a mixture of 600 ml. of water and 500 ml. of ether. The aqueous layer is separated and extracted once with 100 ml. of ether. The combined organic solution is washed with 300 ml. of brine, dried, and concentrated in vacuo to yield a yellow oil which is crystallized from aqueous isopropanol to yield a yellow light textured solid, M.P. 45–49°. A 5.0 g. sample is recrystallized again from aqueous isopropanol to yield 1,1'-di-α-hydroxyhexylferrocene, M.P. 58.5–60°.

*Analysis.*—Calcd. for $C_{22}H_{34}FeO_2$: C, 68.46; H, 8.87; Fe, 14.45. Found: C, 68.39; H, 9.07; Fe, 14.45.

Example 9.—1.1'-dihexyl-α,α'-epoxyferrocene

To 100 ml. of glacial acetic acid is added 10.0 g. (0.026 mole) of 1,1'-di-α-hydroxyhexylferrocene in 5 minutes. The solution is stirred at room temperature for 5.5 hours. To a mixture is added 100 ml. of water in 0.5 hour, and an additional 200 ml. of water is added in one portion. The mixture is extracted twice with 100 ml. portions of benzene. The combined extracts are washed twice with 150 ml. portions of saturated sodium bicarbonate solution and once with 150 ml. of brine, after which they are dried and concentrated to yield a dark oil. This is chromatographed through aluminum oxide (75 g., 2×.35 cm.) using 100 ml. of n-hexane as an eluent to yield 1,1'-dihexyl-α,-α'-epoxyferrocene in the form of a clear dark-gold oil.

*Analysis.*—Calcd. for $C_{22}H_{32}FeO$: C, 71.74; H, 8.76; Fe, 15.16. Found: C, 71.87; H, 8.90; Fe, 14.90.

Example 10.—1-acetyl-1'-propionylferrocene

To a dispersion of 20.3 g. (0.15 mole) of aluminum chloride in 200 ml. of dichloromethane is added dropwise a solution of 13.9 g. (0.06 mole) 1-acetylferrocene in 125 ml. of dichloromethane. The mixture is heated to reflux and 6.1 g. (0.07 mole) of propionyl chloride in 100 ml. dichloromethane is added in 25 minutes after which it is refluxed for an additional 35 minutes. The mixture is poured into 1 liter of ice water and extracted with chloroform. The extract is washed with 10% sodium hydroxide solution, brine, and concentrated to yield a dark oil which is chromatographed through activated alumina using ether as an eluent to yield a semisolid which is crystallized. It is recrystallized from ether and cooled in a Dry Ice/acetone bath to yield an orange solid, 1-acetyl-1'-propionylferrocene, M.P. 58.5–59°.

*Analysis.*—Calcd. for $C_{15}H_{16}FeO_2$: C, 63.41; H, 5.68. Found: C, 63.42; H, 5.53.

Example 11.—1-(α-hydroxyethyl)-1'-(α'-hydroxypropyl)ferrocene

A mixture of 13.8 g. (0.049 mole) of 1-acetyl-1'-propionylferrocene and 4.0 g. (0.16 mole) of sodium borohydride in 225 ml. of isopropanol is refluxed for 4.5 hours. The mixture is concentrated and 50 ml. of brine and 150 ml. of ether are added. The mixture is then stirred for 10 minutes. The ether solution is separated, washed with brine, dried, and concentrated. The residue is taken up in 150 ml. of benzene, treated with activated charcoal, and concentrated to yield a yellow oil which is derived at 70°/4.0 mm. to yield 1-(α-hydroxyethyl)-1'-(α'-hydroxypropyl)ferrocene, B.P. 140°/0.05 mm.

*Analysis.*—Calcd. for $C_{15}H_{20}FeO_2$: C, 62.51; H, 7.00; Fe, 19.39. Found: C, 62.69; H, 7.25; Fe, 19.35.

Example 12.—1-ethyl-1'-propyl-α,α'-epoxyferrocene

Three grams (0.0104 mole) of 1-(α-hydroxyethyl-1'-(α'-hydroxypropyl)ferrocene is dissolved in 100 ml. of glacial acetic acid and the solution allowed to stand at room temperature with stirring for 40 minutes.

To the reaction mixture is added dropwise 250 ml. of water and the reaction mixture is stirred at room temperature for 1 hour. The semi-solid product is separated by decantation and recrystallized twice by dissolving the product in 50 ml. of methanol and adding the filtrate (methanol) to 200 ml. of water. After drying, 1-ethyl-1'-propyl-α,α'-epoxyferrocene, M.P. 66–70°, is obtained in the form of yellow plates.

Analysis.—Calcd. for $C_{15}H_{18}FeO$: C, 66.69; H, 6.71. Found: C, 66.68; H, 6.53.

Example 13.—1-acetyl-1'-benzoylferrocene

To a dispersion of 21.6 g. (0.162 mole) of aluminum chloride in 200 ml. of dichloromethane is added 9.8 g. (0.07 mole) of benzoyl chloride, dissolved in 30 ml. of dichloromethane in 15 minutes. A solution of 14.8 g. (0.065 mole) of 1-acetyl-ferrocene in 150 ml. dichloromethane is then added in 20 minutes after which the mixture is stirred for 2 hours at room temperature and then poured into 1 liter of ice water. The organic layer is separated, and the aqueous layer extracted twice with chloroform. The organic solutions are combined and washed twice with 200 ml. portions of 10% sodium hydroxide, once with brine, dried, and concentrated to yield a red oil. It is chromatographed through activated alumina. n-Hexane (2.5 liters) is passed through the column to yield a yellow solid which is recrystallized from n-hexane to yield 2.3 g. of 1-acetylferrocene. A 50% solution of n-hexane and ether (800 ml.) is then passed through the column to yield a red oil which is crystallized from 100 ml. of ether, cooled in a salted ice bath to give 1-acetyl-1'-benzoylferrocene in the form of a bright red powder, M.P. 69–70°.

Analysis.—Calcd. for $C_{19}H_{16}FeO$: C, 68.71; H, 4.85. Found: C, 68.85; H, 5.01.

Example 14.—1-(α-hydroxyethyl)-1'-(α'-hydroxybenzyl)ferrocene

A mixture of 4.4 g. (0.013 mole) of 1-acetyl-1'-benzoylferrocene and 1.06 g. (0.08 mole) of sodium borohydride in 65 ml. of isopropanol is gently refluxed for 4.5 hours after which it is concentrated in vacuo to yield a yellow residue which is stirred in a mixture of 100 ml. of ether and 50 ml. of brine for 0.5 hour. The aqueous layer is separated and extracted twice with ether. The organic solutions are combined, washed with brine, dried, and concentrated to yield a solid which is recrystallized from ethanol to yield 1-(α-hydroxyethyl)-1'-(α'-hydroxybenzyl)ferrocene in the form of a yellow crystalline powder, M.P. 122–123.5°.

Analysis.—Calcd. for $C_{19}H_{20}FeO_2$: C, 67.87; H, 6.00 Found: C, 67.89; H, 6.20.

Example 15.—1-ethyl-1'-benzyl-α,α'-epoxyferrocene

1 - (α - hydroxyethyl)-1'-(α'-hydroxybenzyl)ferrocene (1.5 g., 0.00445 mole) is dissolved in 75 ml. of glacial acetic acid and the solution is allowed to stand at room temperature with stirring for 30 minutes.

To the solution is added in portions 300 ml. of water and the mixture is stirred at 0°–10° C. for 20 minutes. The reaction mixture is filtered and the residue washed with water. After drying there is obtained 1.3 g. (92%) of 1-ethyl-1'-benzyl-α,α'-epoxyferrocene in the form of yellow plates, M.P. 103–106°.

Analysis.—Calcd. for $C_{19}H_{18}FeO$: C, 71.71; H, 5.71. Found: C, 71.73; H, 5.99.

It will be readily apparent to those skilled in the art that the ferrocene cyclic ethers may exist in different stereochemical forms.

I claim:
1. The process of preparing a ferrocene cyclic ether of the formula

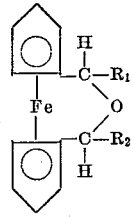

wherein $R_1$ and $R_2$ are selected from the group consisting of hydrogen, a lower alkyl, aryl, aralkyl, cycloalkyl and cycloalkyl-lower alkyl which comprises dissolving a diol of the formula

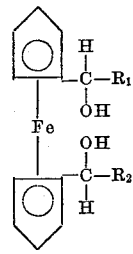

in an acidic media, containing from about 70% to slightly less than 100% by volume of a liquid lower aliphatic acid containing 1 to 3 carbon atoms, then adding water to the resulting solution to precipitate the ferrocene cyclic ether which forms.

2. The process of preparing a ferrocene cyclic ether of the formula

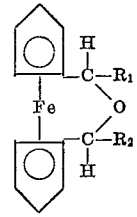

wherein $R_1$ and $R_2$ are selected from hydrogen, lower alkyl, phenyl, halogen substituted phenyl, benzyl, phenethyl, phenylisopropyl, diphenylmethyl, a cycloalkyl having from 3 to 7 carbon atoms and a cycloalkyl-lower alkyl which process comprises dissolving a diol of the formula

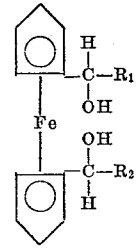

in an acidic media, containing at least 70% by volume of acetic or propionic acid, then adding water, in increments, to said solution to form and selectively precipitate the ferrocene cyclic ether.

3. The process of preparing a ferrocene cyclic ether of the formula

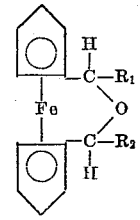

wherein $R_1$ and $R_2$ are selected from the group consisting of hydrogen, a lower alkyl, phenyl, halogen substituted phenyl benzyl, phenethyl, phenylisopropyl, diphenylmethyl, cycloalkyl of 3 to 7 carbon atoms and cycloalkyl-lower alkyl which comprises dissolving a diol of the formula

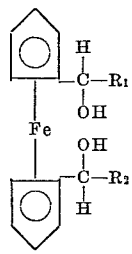

in a concentrated acetic acid solution, containing at least 70% by volume of the acid, agitating the solution, then adding sufficient water, in increments, to said solution to precipitate the ferrocene cyclic ether which forms.

4. The process of claim 3 in which $R_1$ and $R_2$ are methyl.

5. The process of claim 3 in which $R_1$ and $R_2$ are benzyl.

6. The process of claim 3 in which $R_1$ and $R_2$ are hexyl.

7. The process of claim 3 in which $R_1$ is ethyl and $R_2$ is propyl.

8. The process of claim 3 in which $R_1$ is ethyl and $R_2$ is benzyl.

9. The process of claim 3 in which the acetic acid solution is glacial acetic acid.

References Cited

Winslow et al., J. Org. Chem., 26 (1961), p. 2982.
Mashburn et al., J. Org. Chem., 26 (1961, pp. 1671–2.
Rinehart et al., J. Am. Chem. Soc., 82 (1960), p. 4111–2.
Schlogl et al. Naturwiss (48) 1961, pp. 376–7.
Yamakawa et al., Chem. Abst. 59 (1963), col. 8787.
Nesmeyanov et al., Chem. Abst. 58 (1963), col. 7971.

TOBIAS E. LEVOW, *Primary Examiner.*

A. P. DEMERS, *Assistant Examiner.*